July 22, 1924.

H. L. VAN VALKENBURG ET AL

MOTOR STARTER

Filed Jan. 5, 1920

Inventors.
Hermon L. Van Valkenburg.
Francis W. Magin.
By Cheever & Cox Attys.

July 22, 1924.

H. L. VAN VALKENBURG ET AL 1,502,361

MOTOR STARTER

Filed Jan. 5, 1920

Inventors.
Hermon L. Van Valkenburg
Francis W. Magin.
By Cheever & Cox Attys

Patented July 22, 1924.

1,502,361

UNITED STATES PATENT OFFICE.

HERMON L. VAN VALKENBURG AND FRANCIS W. MAGIN, OF MILWAUKEE, WISCONSIN, ASSIGNORS TO INDUSTRIAL CONTROLLER COMPANY, OF MILWAUKEE, WISCONSIN, A CORPORATION OF WISCONSIN.

MOTOR STARTER.

Application filed January 5, 1920. Serial No. 349,576.

*To all whom it may concern:*

Be it known that we, HERMON L. VAN VALKENBURG and FRANCIS W. MAGIN, citizens of the United States, residing at Milwaukee, in the county of Milwaukee and State of Wisconsin, have invented a certain new and useful Improvement in Motor Starters, of which the following is a specification.

Our invention relates to motor starters including particularly starters of the compensator type in which the motor is first energized thru an auto-transformer and after the motor has attained sufficient speed the auto-transformer is cut out of circuit and the motor is energized direct from the line. The present application is similar in some respects to Van Valkenburg Patent No. 1,420,789 and in a more limited respect to Van Valkenburg Patent No. 1,361,934. The apparatus shown in the present application is sometimes referred to as an "automatic compensator" and includes a starting switch by which the motor is energized thru the compensator, a running switch by which the motor is energized direct from the supply conductors and time limit mechanism for operating said switches in appropriate sequence. In carrying out the invention in its present form the starting and running switches are both controlled electromagnetically by the aid of two controlling switches, one of which will be especially identified as the "time switch" and the other as the "setting switch." The time switch is for controlling the starting switch and is held in acting condition for a preordained period. The setting switch is for controlling the running switch, the latter being also subject to the action of a "holding switch" which holds the running switch closed after it has been closed by the action of the setting switch. By employing a holding switch for the running switch, we have made it possible to employ a setting switch of the momentary contact type; and as this setting switch needs make but momentary contact, it is able to begin and end its cycle in non-acting position, thus leaving it always in readiness to have its cycle repeated.

According to the illustrated form of the invention, the time switch and setting switch are actuated by a common time controlled element which forms part of a time limit device. The time limit device shown is a clock-work escapement similar in many respects to the well known mechanism used for messenger call boxes and fire alarms. Such a mechanism, it will be observed, is a purely mechanical one as distinguished from an electromagnetic one and is set or strained by the physical energy of the operator instead of by the electrical energy. One advantage of this is that it may be placed in a control box or station remote from the other parts of the motor starter. Another advantage is that a partial movement of the operating handle produces no effect on the mechanism. The handle must be moved its full distance and be thereupon released, after which the various steps of the cycle occur in proper sequence and with the proper lapse of time between the different steps. When the cycle is complete, the parts are reestablished in initial position ready for a fresh cycle. The illustrated device includes a control disc or a segment which is compelled to make one full revolution.

The general object of the invention is to provide a construction having the above described characteristics and advantages. Contributory objects will become apparent as the description proceeds.

We accomplish our object by the mechanism illustrated in the accompanying drawings in which—

Like numerals denote like parts throughout the several views.

Figure 1:
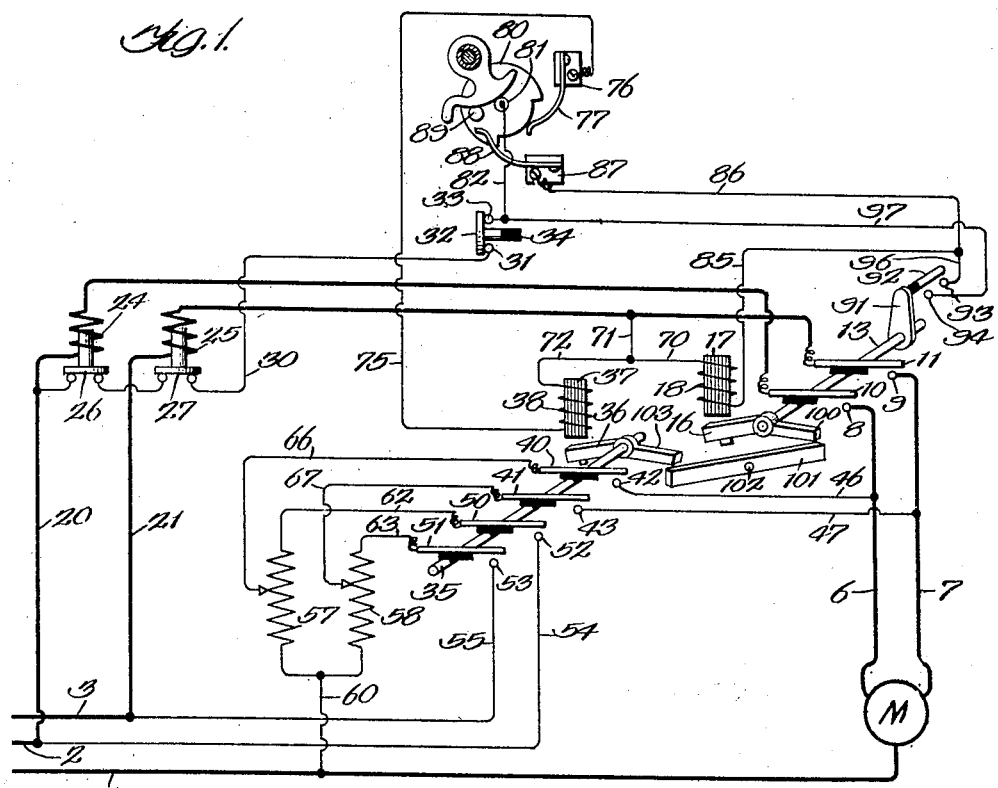
Figure 1 is a wiring diagram showing the system as a whole.

The conductors 1, 2, 3 represent the three supply conductors of a three-wire alternating current system.

Conductor 1 leads direct to the motor M.

The two remaining terminals of the motor are connected to the conductors 6, 7 which lead to the stationary contacts 8, 9 of the running switch. The switch arms 10 and 11 which are adapted to engage the contacts 8, 9 are rigidly fastened to but insulated from a rock shaft 13. Said shaft is controlled by an armature 16 adapted to be attracted to the core 17 of an electromagnetic coil 18. When the coil is energized the armature is attracted upward to it, which causes the switch arms 10, 11 to engage their respective contacts 8 and 9. Otherwise the weight of the armature causes it to drop down and open the switch. A conductor 20 leads from the supply conductor 2 to the switch arm 10 and a conductor 21 leads from the supply conductor 3 to the switch arm 11. In series with the conductors 20, 21 are overload coils 24, 25 which control overload switches 26, 27 respectively. These switches are adapted to open up the conductor 30 in case of overload and cause the de-energization of the coil 18 as will presently more fully appear. A manually controlled stop switch 32 is also adapted to open the circuit of conductor 30. It is adapted to cooperate with two stationary contacts 31, 33 connected respectively to conductor 30 and conductor 97 hereinafter mentioned. It is operated by a push button 34.

The starting switch has two arms 40, 41 rigidly fastened to but insulated from a rock shaft 35 controlled by an armature 36 adapted to be attracted by the core 37 of an electromagnetic coil 38. These arms are adapted to engage stationary contacts 42, 43 respectively. Said contacts are connected by the conductors 46, 47, to the conductors 6, 7, respectively. The other two switch arms 50, 51 are adapted to engage stationary contacts 52, 53 respectively. These are connected by conductors 54, 55 to the supply conductors 2, 3, respectively. The diagram shows a two coil transformer and hence has but two switch arms. Each of the transformer coils 57, 58 has one connected directly to the line by a conductor 60. The other ends are connected by conductors 62, 63 to the switch arms 50, 51 respectively. Intermediate points of the transformer coils are connected by conductors 66, 67 to the switch arms 40, 41 respectively. The parts are so designed that when coil 38 is energized the armature 36 will be attracted upward and move the switch arms 40, 41, 50, 51, to closed position; but when the coil is de-energized the weight of the armature will open them.

One end of the running switch coil 18 is connected by conductors 70, 71, to the conductor 21 and thru it to the supply conductor 3. One end of the coil 38 of the starting switch is connected by a conductor 72 to the conductor 71. The remaining end of coil 38 is connected by a conductor 75 to a post 76 which is of conductive material and supports a finger 77 which constitutes the stationary terminal of the time switch. Said finger is adapted to be engaged by the periphery of a rotatable disc or segment 80 which is of conductive material and rigidly fastened to a shaft 81 which is also conductive. Shaft 81 is electrically connected by a conductor 82 to one of the terminals of the stop switch 32. A portion of the circumference of the disc 80 is cut away so that under normal conditions both of prestarting and of running the finger 77 is out of contact as shown in the diagram. As the disc rotates, however, it first brings the acting portion into engagement with finger 77, thus establishing electric connection between the conductors 82 and 75. This condition is maintained for a definite interval after which the acting portions of the disc moves from under the finger and again breaks contact. This disc constitutes a time controlled element being under the control, in the selected design, of a clockwork escapement the physical characteristics whereof will be hereinafter more fully described. It will be sufficient for the present to state that under the normal prestarting and running conditions, the coil 38 of the starting switch will be deenergized and the starting switch will be open, but when said disc is caused to rotate and bring the acting portion into engagement with finger 77, the coil 38 will be energized as follows: from the supply conductor 2 to conductor 20 to switches 26 and 27 to conductor 30 to switch 32 to conductor 82, to shaft 81, to segment 80, to finger 77, and post 76, to conductor 75, thru coil 38, to conductor 72, to conductor 71, to conductor 21, to supply conductor 3.

As to the running switch mechanism, the coil 18 is connected at one end to the supply conductor 3 thru the conductor 3 thru the conductors 70, 71 and 21 previously mentioned. The other end of the coil is connected by a conductor 85 to a conductor 86 which is connected to a terminal post 87 which is of conductive material and carries a finger 88 adapted to be engaged by a conductive pin 89 fastened to the side of disc 80. As the disc rotates, the pin makes momentary contact with the finger and for the moment energizes coil 18 as follows: from line conductor 3 to conductor 21, to conductor 71, to conductor 70, to coil 18, to conductor 85, to conductor 86, to post 87, to finger 88, to pin 89, to segmental disc 80, to shaft 81, to conductor 82, to switch 32, to conductor 30, to switches 27 and 26, to conductor 20, to supply conductor 2. Thus the momentary engagement of the pin 89 with the finger 88 energizes coil 18 and rotates rock shaft 13 in a direction to close the running switch arms 10, 11. Rigidly fastened to the rock shaft is an arm 91 having a holding switch 92 adapted to bridge two contacts 93, 94. The contact 93 is electrically connected to conductor 85 thru the conductor 96, while the contact 94 is electrically connected by the conductor 97 to the conductor 82. It will be evident therefore, that the circuit of the holding switch is in multiple with the setting switch 88, 89, and that the holding switch is actuated by the rock shaft of the running switch. As this rock shaft is itself controlled by the switch 88, 89, the holding switch may be regarded as under the control of said switch 88, 89. It will also be evident that the switches 77, 80 and 88, 89 are "controlling switches" for controlling the circuits of the electromagnets which control the starting and running switches respectively. When the holding switch has once been closed, it will hold the running switch closed by maintaining the circuit thru the coil 18 as follows: from supply conductor 3 to conductor 21, to conductor 71, to conductor 70, to coil 18, to conductor 85, to conductor 96, to switch 92, to conductor 97, to switch 32, to conductor 30, to switches 27 and 26, to conductor 20, to supply conductor 2. Consequently, the closure of the running switch due to the momentary engagement of pin 88 and finger 89 will close the holding switch 92, which will hold the running switch closed and relieve the switch 88, 89 of the necessity of remaining closed. This construction permits the use of a momentary contact switch for controlling the running switch. That is, it renders it permissible to employ a switch which may be returned at once to prestarting position, ready to be operated again. In our construction, this is done automatically.

With respect to the lock-out mechanism for insuring the opening of the starting switch simultaneously with the closing of the running switch: Rock shaft 13 is provided with an arm 100 adapted to engage a lever 101 pivoted upon a stationary fulcrum 102. This lever is adapted to engage an arm 103 rigidly fastened to the rock shaft 35. The parts are so arranged that when the running switch closes the arm 100 will rotate lever 101 in such manner that said lever, operating upon the arm 103, will rotate the shaft 35 to a position in which the arms of the starting switch will be out of engagement with their respective stationary contacts.

Figure 3:
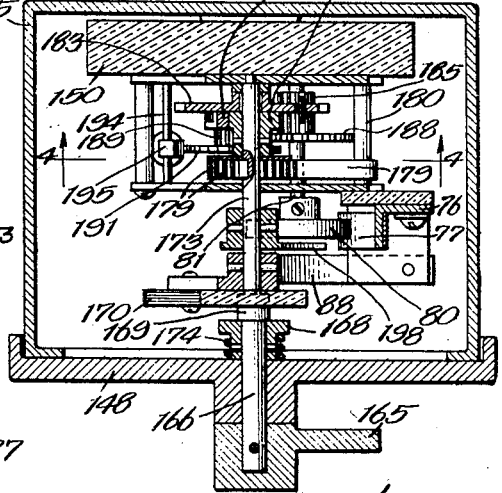
Figure 3 is a plan section on the line 3—3 Figure 2.
Figure 4:
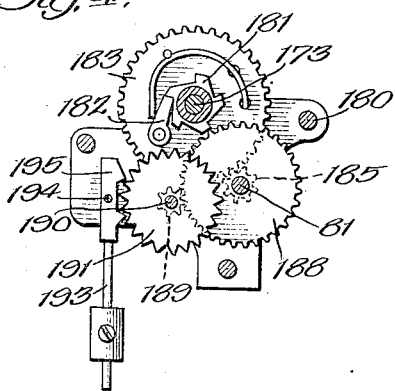
Figure 4 is a detail of the escapement mechanism and associated parts shown in sectional elevation on the line 4—4 Figure 3. These are component parts of the time limit device.

The time limit device which forms the master mechanism for the system and which is hand set, operates the disc 80 in such manner as to give it one complete revolution every time it is manually operated. The details of this device may be considerably varied but the illustrated construction is substantially that of a call-box used by telegraph companies, for example, for calling messengers. As these boxes are well known it is not necessary to illustrate or describe the present one in complete detail. According to the illustrated design the box proper 145 has a panel 150 of slate or other insulating material fastened within it. It is provided with a cover 148 in front and has an operating handle 165 which lies in front of the cover. This is rigidly fastened to a setting shaft 166 which is journaled in the cover and is rigidly fastened to a setting lever 168 which lies inside of the cover and is provided with two pins 169 adapted to engage a bar 170 rigidly fastened to the clock spring shaft 173. Shaft 166 is constantly urged to rotate in an anti-clockwise direction, Figure 2, by suitable spring mechanism (not shown). This is for the purpose of returning the handle to normal, prestarting position after it is released by the operator. The pins 169 engage bar 170 on only the rear edge so that the operating handle is operative to set the bar, but may return instantly to normal position and yet permit the bar to return slowly, subject to the retarding action of the escapement. The negative rotation of the setting lever is limited by a suitable stop on the cover (not shown). The shaft 81 shown in the diagram and described in connection with it receives its timed rotary movement from the spring actuated shaft 173 just mentioned. It is driven through an escapement and train of gearing, the precise construction of which is immaterial. It will be sufficient for the present purpose to say that the main spring 179 is anchored at one end to shaft 173 and at the other end to a post 180 which forms a part of the train work of the escapement, and is best shown in Figure 3. Rigidly fasened to the shaft 173 is a ratchet wheel 181 which cooperates with a pawl 182 mounted upon the gear wheel 183, as best shown in Figure 4. This meshes with a pinion 185 which is fastened to shaft 81, previously described. Shaft 81 is fastened to a gear wheel 188 which drives a pinion 189, which is fastened to a shaft 190 which drives the escapement wheel 191. A pendulum 193 is fulcrumed on a pin 194 and is provided with pallets 195 which alternately engage the teeth of the escapement wheel. The construction is such that while the main spring or setting shaft oscillates back and forth, the shaft 81 rotates slowly and always in the same direction. The shaft always makes one complete revolution, stop mechanism being provided for limiting its movement. According to the illustrated design the stop is in the form of a segmental arm 198 which is rigidly fastened to shaft 173. When the handle is rotated in a clockwise direction to set the mechanism this segment moves out of the path of pin 89 thus permitting disc 80 to rotate in a clockwise direction. As soon as the handle is released the segment swings back to the position shown in Figure 2 with the result that when the disc has completed a revolution the pin 89 will encounter the arm 198 and be arrested by it. According to this design, therefore the pin 89 constitutes both an electric contactor and a mechanical stop.

Figure 2:
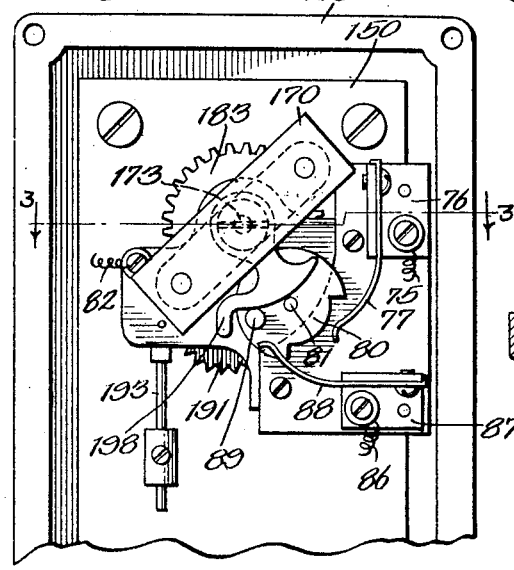
Figure 2 is a front elevation of the upper portion of the control box or station with the front cover removed.
Figure 5:
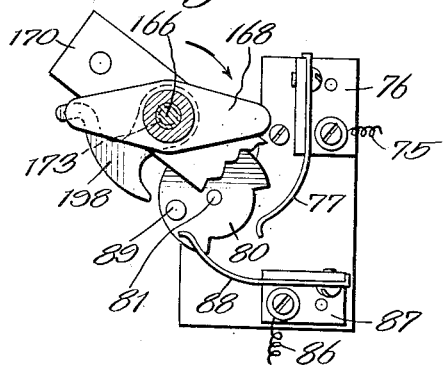
Figures 5, 6 and 7 illustrate different positions of parts of the time limit device and of the switches which they operate.
Figure 6:
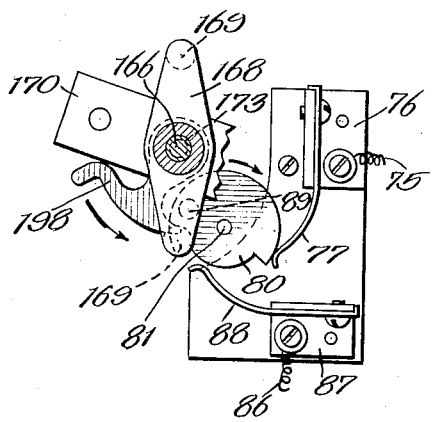
Figure 7:
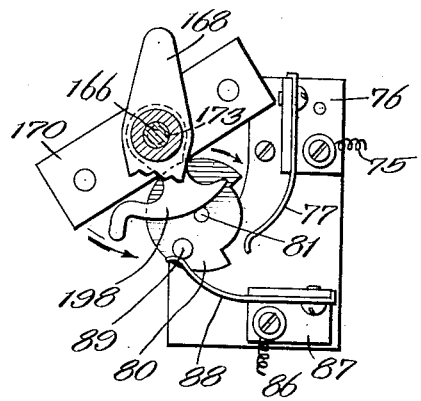

The operation of the time limit device will now be readily understood, it being evident that in normal pre-starting position the parts will occupy the position shown in Fig. 2. When the operator rotates the handle 165 in a clockwise direction he will bring the parts to the position shown in Figure 5. As soon as he releases the handle the escapement mechanism will cause disc 80 to rotate clockwise and engage the switch terminal 77 as shown in Figure 6. The disc continues to rotate, bringing the contactor 89 into momentary engagement with the switch terminal 89. It then passes beyond, but in the meantime segmental arm 198 has resumed the normal position shown in Figures 2 and 7, whereupon the pin 89 will be arrested as soon as it comes into contact with said segmental arm. The operation of the electrical connections resulting from this operation of the time limit device has already been described.

Having thus described our invention what we claim as new and desire to secure by Letters Patent, is:

1. A motor starter having a starting switch for energizing the motor during the starting period, a running switch, said switches being biased toward open position and having electromagnetic coils for closing them, and a time controlled element for controlling said coils, said time controlled element having a rotating disc adapted to make a complete rotation each time the device is operated, said disc having a long contact extending over a considerable number of degrees, and a momentary contact, the long contact being adapted to close the circuit through the coil of the starting switch, and a maintaining switch adapted to maintain the circuit through the coil of the running switch, the momentary contact being adapted to energize the coil of the running switch to close it, and the maintaining switch being mechanically connected to the running switch to be closed by it at the same time that the running switch is closed.

2. A motor starter having a starting switch for energizing the motor during the starting period, a coil for controlling the starting switch, a time switch for controlling the circuit of said coil, a running switch, self holding in closed position, a second coil for controlling the running switch, and a momentary contact switch for controlling the circuit of the second coil, a clockwork escapement, and a disc controlled by said escapement over a given period of time, said disc forming part of the time switch whereby the circuit may be maintained for a given period, and said disc also forming a part of the momentary contact switch.

In witness whereof we have hereunto subscribed our names.

HERMON L. VAN VALKENBURG.
FRANCIS W. MAGIN.